J. A. SHARPS.
SHADE ROLLER SUPPORT.
APPLICATION FILED JAN. 18, 1916.
1,223,837.
Patented Apr. 24, 1917.
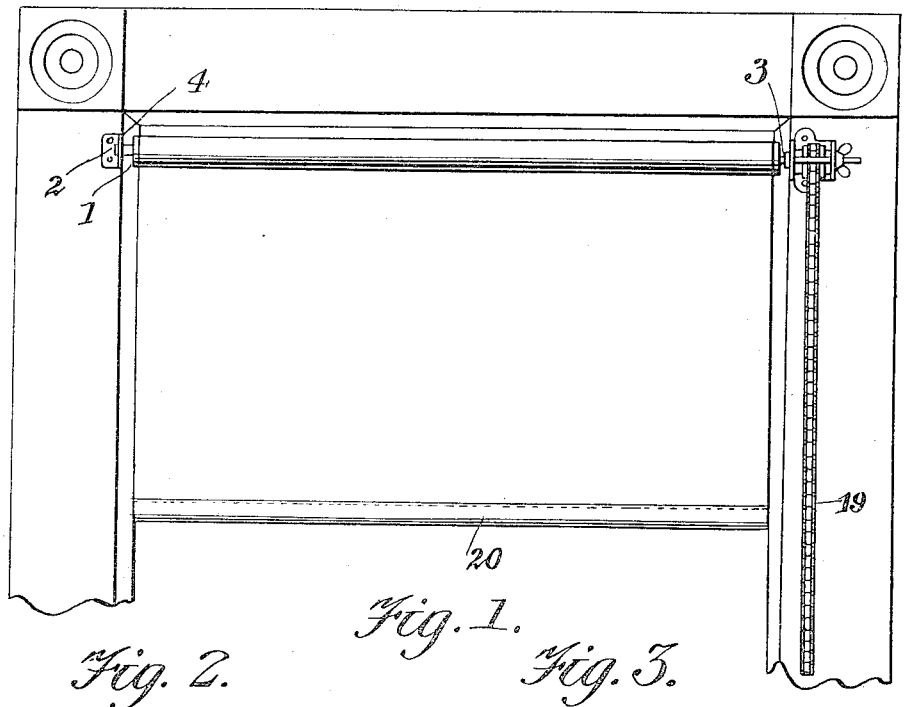
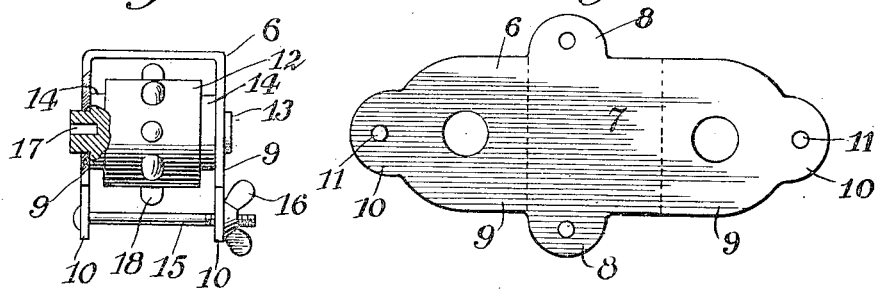
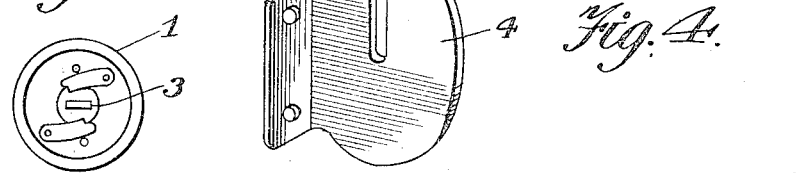
Witnesses
F. Windridge
J. Wilcox
Inventor
J. A. Sharps
By Victor J. Evans
Attorney

UNITED STATES PATENT OFFICE.

JOHN A. SHARPS, OF BABLIN, WEST VIRGINIA.

SHADE-ROLLER SUPPORT.

1,223,837.  Specification of Letters Patent.  Patented Apr. 24, 1917.

Application filed January 18, 1916. Serial No. 72,807.

*To all whom it may concern:*

Be it known that I, JOHN A. SHARPS, a citizen of the United States, residing at Bablin, in the county of Lewis and State of West Virginia, have invented new and useful Improvements in Shade-Roller Supports, of which the following is a specification.

This invention relates to shade roller supports and it consists in the novel features hereinafter described and claimed.

An object of the invention is to provide a support for a shade roller which may be easily and quickly manipulated for turning the roller without the assistance of a spring such as is usually employed in the roller of the Hartshorn type. In conjunction with the present invention means is provided for turning the roller and other means is provided for holding the same so that the shade supported by the roller may be held at any desired position with relation to the window frame.

With the above object in view the support comprises a bracket having a slot and another bracket having a wheel journaled therein and provided with a slot adapted to receive one of the gudgeons of the roller. The wheel is provided at its ends with bosses against which opposite side portions of the brackets bear and means is provided for drawing the said side portions of the bracket toward each other whereby they frictionally engage the bosses and the wheel is held at a position to which it is turned. The wheel is provided at its periphery with a series of teeth arranged annularly about the same and a sprocket chain is trained over the wheel and the links of the chain mesh with the teeth, whereby the chain may be used as a means for turning the wheel.

In the accompanying drawing:—

Figure 1 is a front elevation of the support showing a shade roller mounted thereon.

Fig. 2 is a plan view of part of the support with parts in section.

Fig. 3 is a plan view of the blank of a bracket used in the support.

Fig. 4 is a perspective view of another bracket used in the support.

Fig. 5 is an end view of the shade roller.

As illustrated in the accompanying drawing, the shade roller 1 is of the usual pattern, and is provided at its ends with gudgeons 2 and 3. The gudgeon 2 is cylindrical while the gudgeon 3 is flat in transverse section as shown in Fig. 5. The support includes a bracket 4 which is provided with a slot 5 adapted to receive the cylindrical gudgeon 2 of the roller 1. The bracket 4 is attached to the window frame in any suitable manner.

The support also includes a bracket 6 which is of especial design, and which is preferably formed from a blank of sheet metal having an intermediate portion 7 with lugs 8 formed at the opposite side edges thereof. Side portions 9 are formed at opposite edges of the intermediate portion 7 and are disposed at right angles to the intermediate portion. The side portions 9 are provided at their outer ends with extensions 10 having bolt openings 11. A wheel 12 is provided with an axle 13 which is journaled in the side portions 9 of the bracket 6. The said wheel is further provided at its side and surrounding the axle 13 with bosses 14 against which the inner surfaces of the side portions 9 of the brackets 6 frictionally bear. A bolt 15 passes transversely through the openings 11 of the extension 10 of the side portions 9 of the bracket 6 and a wing nut 16 is screw-threaded upon the end of the bolt 15, and bears against the outer surface of one of the side portions 9. By tightening the wing nut 16 it will be observed that the outer portions of the sides 9 are drawn toward each other whereby the intermediate portions of the said sides 9 are drawn in close contact with the outer surfaces of the bosses 14. The axle 13 at one side of the wheel 12 is provided with a slot 17 which is adapted to receive the flat gudgeon 3 of the shade roller 1. A set of teeth 18 is arranged in an annular row about the periphery of the wheel 12 and an endless chain 19 is trained over the said wheel. The links of the chain 19 engage the teeth 18 at the upper portion of the wheel 12. The shade 20 is arranged to wind upon the roller 1 in the usual manner.

When the parts are properly assembled upon a window frame and it is desired to raise or lower the shade 20, an operator grasps the chain 19 and moves the same whereby the wheel 12 is turned and the shade 20 is unwound from the roller 1 or wound thereon according to the direction in which the chain 19 is moved. When the shade 20 is at a desired position with relation to the window frame it is held by the frictional contact between the side portions 9 of the bracket 6 and the bosses 4 of the wheel 12.

From the above description taken in conjunction with the accompanying drawing it will be seen that a shade roller support of simple and durable design is provided and that the said support may be used in conjunction with a roller 1 which is devoid of a spring or in the event that the roller 1 is provided with a spring, the pawls which are usually provided upon such a roller are secured by means of tacks passed into the end of the roller and behind the pawls whereby the pawls are held in permanent engagement with the adjacent gudgeon. In other words the spring roller is converted into a roller in which the spring performs no function. The same operation is followed in the event that a spring roller is used in which the spring is broken or has become disconnected from adjacent parts.

Having described the invention what is claimed is:—

A shade roller support comprising a bracket having an intermediate portion and side portions, means for drawing the side portions toward each other, a wheel having an axle journaled in the side portions and provided with bosses which are frictionally engaged by the side portions, the wheel having means for engaging a shade roller, teeth provided upon the wheel and a chain trained about the wheel and having links which mesh with the teeth.

In testimony whereof I affix my signature in presence of two witnesses.

JOHN A. SHARPS.

Witnesses:
C. G. HAESSING,
L. A. REPROAD.

Copies of this patent may be obtained for five cents each, by addressing the "Commissioner of Patents, Washington, D. C."